(No Model.) 2 Sheets—Sheet 1.
F. B. GRAHAM & J. H. KNAPP.
HAY PRESS ATTACHMENT.
No. 490,072. Patented Jan. 17, 1893.
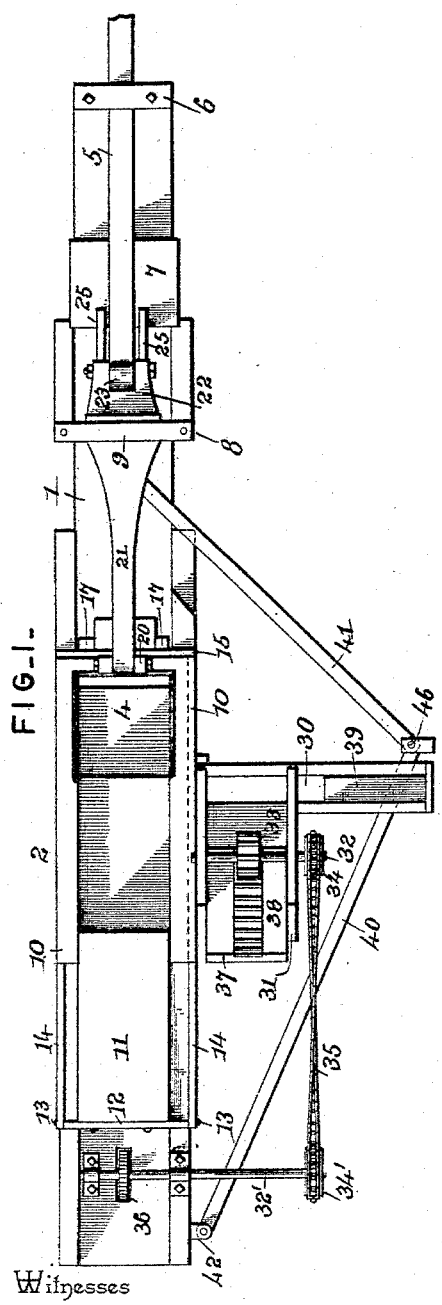
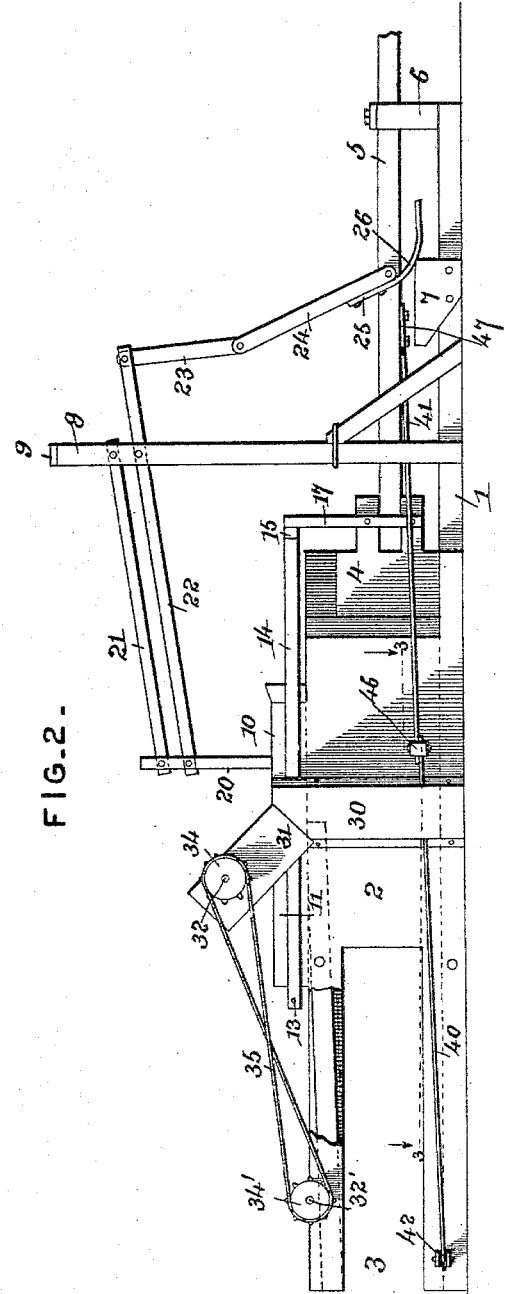
Witnesses
Jas. K. McCathran
N. S. Collamer
Inventors
Frank Bruce Graham
James Harvey Knapp
By their Attorneys,
C. A. Snow & Co.

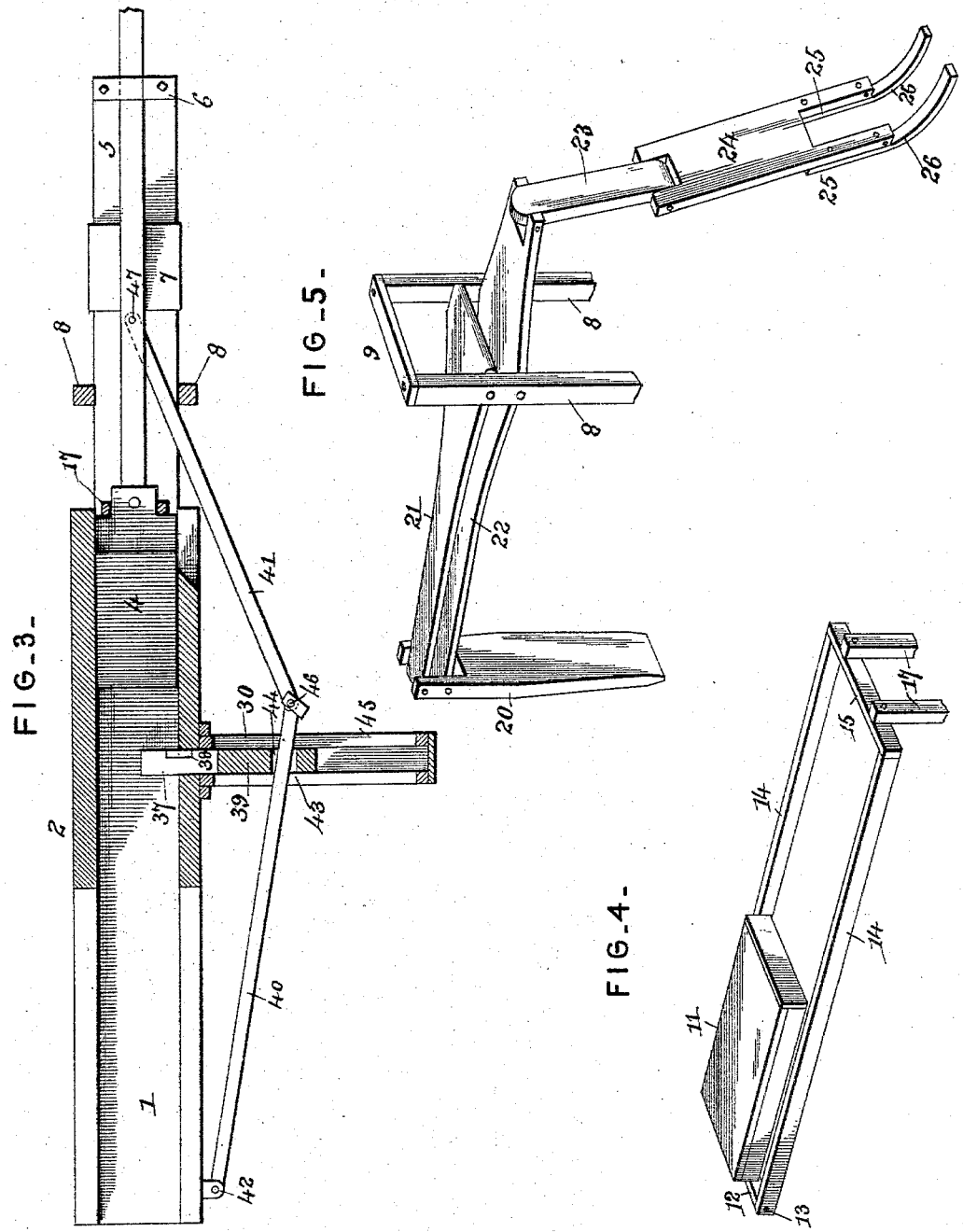

UNITED STATES PATENT OFFICE.

FRANK B. GRAHAM AND JAMES HARVEY KNAPP, OF WESTPHALIA, KANSAS.

HAY-PRESS ATTACHMENT.

SPECIFICATION forming part of Letters Patent No. 490,072, dated January 17, 1893.

Application filed January 7, 1892. Serial No. 417,310. (No model.)

*To all whom it may concern:*

Be it known that we, FRANK BRUCE GRAHAM and JAMES HARVEY KNAPP, citizens of the United States, residing at Westphalia, in the county of Anderson and State of Kansas, have invented a new and useful Hay-Press Attachment, of which the following is a specification.

This invention relates to baling presses, and more especially to bale-box attachments adapted to be used in connection therewith; and the object of the same is to produce certain novel and useful attachments for the purposes set forth.

To this end the invention consists in the devices hereinafter more fully described and claimed, and as illustrated on the accompanying two sheets of drawings, wherein:

Figure 1 is a plan view of this improved press in the act of pressing. Fig. 2 is a side elevation thereof, the plunger being retracted. Fig. 3 is a horizontal section on the line 3—3 of Fig. 2 showing how the bale-head is forced into position in the box. Fig. 4 is a perspective detail of the buncher and its frame. Fig. 5 is a perspective detail of the feeder-operating devices.

Referring to the said drawings, 1 is the base of this improved press on which is mounted a box 2 whose outer ends 3 converge as seen in Fig. 2 for the purpose of giving transverse pressure to the bale.

4 is the plunger-head whose staff 5 will be intermittently reciprocated by any suitable mechanism not shown and forming no part of the present invention. This staff 5 slides through a guide 6 at one end of the base 1 and moves over a cam 7 and between two uprights 8 which are connected across their tops by a bar 9. The upper side of the box is open at its feed-end at the proper point to feed the hay or grass which is to be baled, and along each side of this opening is a raised rail 10 between which slides a box-shaped buncher 11. Across the outer end of this buncher is secured a bar 12 whose ends are pivoted as at 13 to a frame consisting of side-bars 14 sliding in grooves under said rails 10, and a connecting bar 15 across the opposite end of the box. The latter cross-bar is connected by rods or bars 17 with the plunger, so that the entire frame and buncher will move with the plunger.

20 is the feeder which stands in an upright position above the box, and this feeder is pivotally connected with two arms 21 and 22. The former of these arms is pivoted at its other end to the uprights 8, while the latter, which is also pivoted between said uprights, extends for some distance beyond them, and to its extremity is pivoted a link 23 whose lower end is in turn pivoted to a lever 24, and the latter is pivoted at its lower end to the plunger-staff. A jointed-lever is thus formed by the two links 23 and 24, and this lever is operated by a pair of rigid feet 25 which are secured to the lower link 24 and extend below the plunger-staff. The feet are bent as at 26 and are adapted, when the plunger-staff reciprocates, to travel over the cam 7 whereby the feeder 20 will be given the proper motions.

At the front side of the box 2 is located a narrow passageway 30 standing at right angles to the length of the box and open at its top, and leading into this passageway is an inclined chute 31 across which is journaled a shaft 32 bearing within the chute a gear 33 and outside said chute a sprocket-wheel 34.

35 is a twisted belt or chain connecting said sprocket-wheel with another sprocket-wheel 34' mounted on a shaft 32' which is journaled in the upper side of the box near its outer end and is provided with a toothed wheel 36 which projects through said box as seen in Fig. 1.

37 is the bale head which has a rack-bar 38 on one face adapted to mesh with the gear-wheel 33. The passageway 30 communicates with the box as seen in Fig. 3, and in said passageway moves a block 39 which is actuated by its connection with two long bars or rods 40 and 41, the former of which is pivoted at 42 to the base, passes through a slot 43 in the left side of the passageway and loosely through a hole 44 in said block, and then through a slot 45 in the right side of the passageway; and the second of which, 41, is pivoted at 46 at one end to the first rod and at its other end, as at 47, to the plunger-staff.

The operation of this machine is as follows. As the plunger moves in, the buncher slides back over the box, the feeder rises, and the block moves outwardly in the passageway. The hay or grass is then laid upon the upper side of the box and a bale head being placed in the chute with its rack-bar engaging the gear-wheel therein, the plunger-staff is retracted. This movement causes the buncher to push the hay or grain over the hole in the box, the feeder to descend and drive the hay into the box in front of the plunger-head, and the block in the passageway to move inwardly, thus moving a bale-head which at this time stands in the passageway, into the box at some distance from the face of the plunger-head, as will be understood. The plunger-staff now moving forwardly again, the same operations take place as above described, but in addition the bale which is formed, as it is pushed out the contracted end of the box, moves under the toothed wheel which is connected by belting with the gear-wheel in a proper manner, as by twisting the belt as shown, and the result is that the movement of the bale through the box causes the gear-wheel to turn in the proper direction to move the bale-head which stands in the chute, downwardly, and it drops out of the chute into the passageway in front of the block therein which is at this time standing at the outer end of the passage way as above described. At each forward movement of the plunger-staff, the feet of the jointed-lever moves over the cam on the base, and this causes the parallel arms supporting the feeder to turn on their pivots in the uprights so that the feeder is raised. By reason of the fact that these arms are parallel, the feeder will be always in a vertical position.

I do not limit myself to the specific details of construction, as considerable change may be made therein without departing from the spirit of my invention.

What is claimed as new is—

1. In a baling press, the combination with the box, and a reciprocating plunger therein; of a passageway communicating with said box and standing at right angles thereto, an inclined chute leading into said passageway near its inner end, a shaft in the chute, a gear-wheel on the shaft, a bale-head having a rack-bar adapted to engage said gear, and means for turning said shaft to drop the bale head into the passageway, and for then moving said bale-head into the box, as and for the purpose set forth.

2. In a baling press, the combination with the box, a reciprocating plunger therein, a passageway communicating with the box, and a chute leading into the passageway; of a block in the passageway having a hole through its body, a rod pivoted to the frame and passing through slots in the walls of the passageway and intermediately through said hole, and a second rod pivoted at one end to the first and at the other end to the plunger-shaft, as and for the purpose set forth.

3. In a baling press, the combination with the box, a reciprocating plunger therein, and an inclined chute communicating with the box; of a shaft across the chute, a gear-wheel on the shaft, a bale-head having a rack-bar adapted to engage said gear when the bale-head stands in the chute under the shaft, a second shaft journaled in the top of the box, a toothed wheel on this shaft projecting through and into the box, and connections between the two shafts, as and for the purpose set forth.

4. In a baling press, the combination with the box, a reciprocating plunger therein, a lateral passageway communicating with the box and having horizontal slots, an inclined chute leading into said passageway near its inner end, and a toothed wheel journaled in the box and projecting slightly into the same; of a bale-head having a toothed rack on one face, a shaft journaled in the chute and having a gear adapted to engage said rack, connections between this shaft and said toothed wheel, a block sliding in the passageway, and a toggle-lever pivoted at its ends to the frame and to the plunger-shaft with its body passing through the slots in the walls of the said passageway and connected with the block therein, as and for the purpose hereinbefore set forth.

In testimony that we claim the foregoing as our own we have hereto affixed our signatures in the presence of two witnesses.

FRANK B. GRAHAM.
JAMES HARVEY KNAPP.

Witnesses to the signature of Frank B. Graham:
J. ORTON,
T. J. KIBBY.

Witnesses to the signature of James H. Knapp:
E. HEATON,
A. H. WORDEN.